(12) United States Patent
Brown (10) Patent No.: US 8,228,051 B2
(45) Date of Patent: Jul. 24, 2012

(54) SWITCHED MODE POWER SUPPLY WITH FREQUENCY MODULATION CONTROL

(75) Inventor: James S. Brown, San Pedro, CA (US)

(73) Assignee: International Rectifier Corporation, El Segundo, CA (US)

(*) Notice: Subject to any disclaimer, the term of this patent is extended or adjusted under 35 U.S.C. 154(b) by 840 days.

(21) Appl. No.: 11/743,483

(22) Filed: May 2, 2007

(65) Prior Publication Data

US 2007/0258272 A1 Nov. 8, 2007

Related U.S. Application Data

(60) Provisional application No. 60/796,827, filed on May 2, 2006.

(51) Int. Cl.
*G05F 1/565* (2006.01)
*G05F 1/618* (2006.01)

(52) U.S. Cl. ..................................... 323/283

(58) Field of Classification Search .......... 323/282, 323/283, 284, 285, 351
See application file for complete search history.

(56) References Cited

U.S. PATENT DOCUMENTS

| | | | | |
|---|---|---|---|---|
| 4,742,329 A * | 5/1988 | Yamada et al. | ............... | 341/154 |
| 5,079,522 A | 1/1992 | Owen et al. | | |
| 6,020,729 A | 2/2000 | Stratakos et al. | | |
| 6,225,795 B1 * | 5/2001 | Stratakos et al. | ............. | 323/283 |
| 6,384,770 B1 | 5/2002 | de Gouy et al. | | |
| 7,280,061 B2 * | 10/2007 | Dias | ............................. | 341/144 |
| 7,292,013 B1 * | 11/2007 | Chen et al. | .................... | 323/222 |
| 7,358,706 B2 * | 4/2008 | Lys | ................................ | 323/222 |
| 7,579,971 B2 * | 8/2009 | Washburn et al. | ........... | 341/144 |

* cited by examiner

*Primary Examiner* — Gary L Laxton
(74) *Attorney, Agent, or Firm* — Farjami & Farjami LLP (57) ABSTRACT

A frequency modulation controller for use in controlling a switched mode power supply including an input terminal for receiving an input voltage and at least one switch selectively turned on and off to control the output voltage of the power supply in accordance with an embodiment of the present invention includes an analog to digital converter operable to convert a feedback signal indicative of the present output voltage into digital data, a digital conditioning unit operable to provide an error signal based on the digital data from the digital to analog converter for use in generating the frequency modulation signal and a digital to analog converter operable to provide the frequency modulation signal based on the error signal, wherein the frequency modulation signal indicates a desired duty cycle of the at least one switch to maintain a desired output voltage such that the at least one switch of the switched mode power supply is turned on and off in accordance with the desired duty cycle.

10 Claims, 7 Drawing Sheets

SWITCHED MODE POWER SUPPLY WITH FREQUENCY MODULATION CONTROL

CROSS-REFERENCE TO RELATED APPLICATIONS

The present application claims benefit of and priority to U.S. Provisional Patent Application No. 60/796,827 entitled DIRECT DIGITAL SYNTHESIS FREQUENCY MODULATION OF SWITCHING POWER SUPPLIES filed May 2, 2006, the entire contents of which are hereby incorporated by reference herein.

BACKGROUND OF THE INVENTION

The present invention relates to a control circuit for a switched mode power supply. In particular, the present application relates to a switched mode power supply that includes a frequency modulation controller. Switched-mode power supplies, which include voltage converters such as buck converters, for example, typically include, or are connected to a controller that uses pulse width modulation (PWM) to set the duty cycle of the switches. Generally, a PWM controller provides a PWM signal that is used to drive the switches in order to provide the desired output voltage. While specific configurations may vary based on exactly what type of switched mode power supply is used, PWM control is commonly used in a wide variety of power supplies or converters.

The PWM controller may be implemented as an analog circuit or a digital circuit. However, digital control circuits provide some benefits over analog circuits. Some of these benefits are described in co-pending U.S. patent application Ser. No. 11/068,184 entitled HYBRID DIGITAL-ANALOG SWITCHED POWER SUPPLY, filed Feb. 28, 2005, the entire contents of which are hereby incorporated by reference herein. Thus, it has become increasingly common to use digital control circuitry to control the duty cycle of the switches in a switched mode power supply. However, there are certain problems that arise when digital control is used, particularly in high frequency applications. In particular, digital control techniques are difficult to use when the clock frequency is in the very high frequency (VHF) to ultra high frequency (UHF) range. At these high switching frequencies, the resolution offered by the control circuit is often not precise enough. This is the result, at least in part, of the use of PWM control. Consider for example, a circuit in which a 100 Mhz clock signal is used. In this case, increments to the pulse width are limited by the frequency of the clock signal. A minimum increment amount of 10 ns is available for a circuit utilizing a 100 MHz clock signal, operating at a 1 Mhz operating frequency to convert a 12 volt input voltage into a 1 volt output voltage. Since the pulse width is on the order of 100 ns, thus, the minimum incremental change to the pulse width can be no less than 10%. This resolution is simply not sufficient for many applications. Even if a 100 KHz PWM frequency were utilized, the minimum increment to the pulse width would be no less than 1%, which also may not provide suitable resolution for some applications. In addition, when the difference between the input voltage and output voltage increases, these problems are exacerbated even further.

Accordingly, it would be beneficial to provide a control circuit for controlling a switched mode power supply that avoids the problems mentioned above.

SUMMARY OF THE INVENTION

A frequency modulation controller for use in controlling a switched mode power supply including an input terminal for receiving an input voltage and at least one switch selectively turned on and off to control the output voltage of the power supply in accordance with an embodiment of the present invention includes an analog to digital converter operable to convert a feedback signal indicative of the present output voltage into digital data, a digital conditioning unit operable to provide an error signal based on the digital data from the digital to analog converter for use in generating the frequency modulation signal and a digital to analog converter operable to provide the frequency modulation signal based on the error signal, wherein the frequency modulation signal indicates a desired duty cycle of the at least one switch to maintain a desired output voltage such that the at least one switch of the switched mode power supply is turned on and off in accordance with the desired duty cycle.

A switched mode power supply including an input terminal for receiving an input voltage and at least one switch selectively turned on and off to control an output voltage of the power supply in accordance with an embodiment of the present invention includes a frequency modulation controller operable to provide a frequency modulation signal indicative of a desired duty cycle of the at least one switch to maintain a desired output voltage such that the at least one switch is turned on and off in accordance with the desired duty cycle.

Other features and advantages of the present invention will become apparent from the following description of the invention which refers to the accompanying drawings.

DETAILED DESCRIPTION OF PREFERRED EMBODIMENTS OF THE INVENTION

Figure 1:
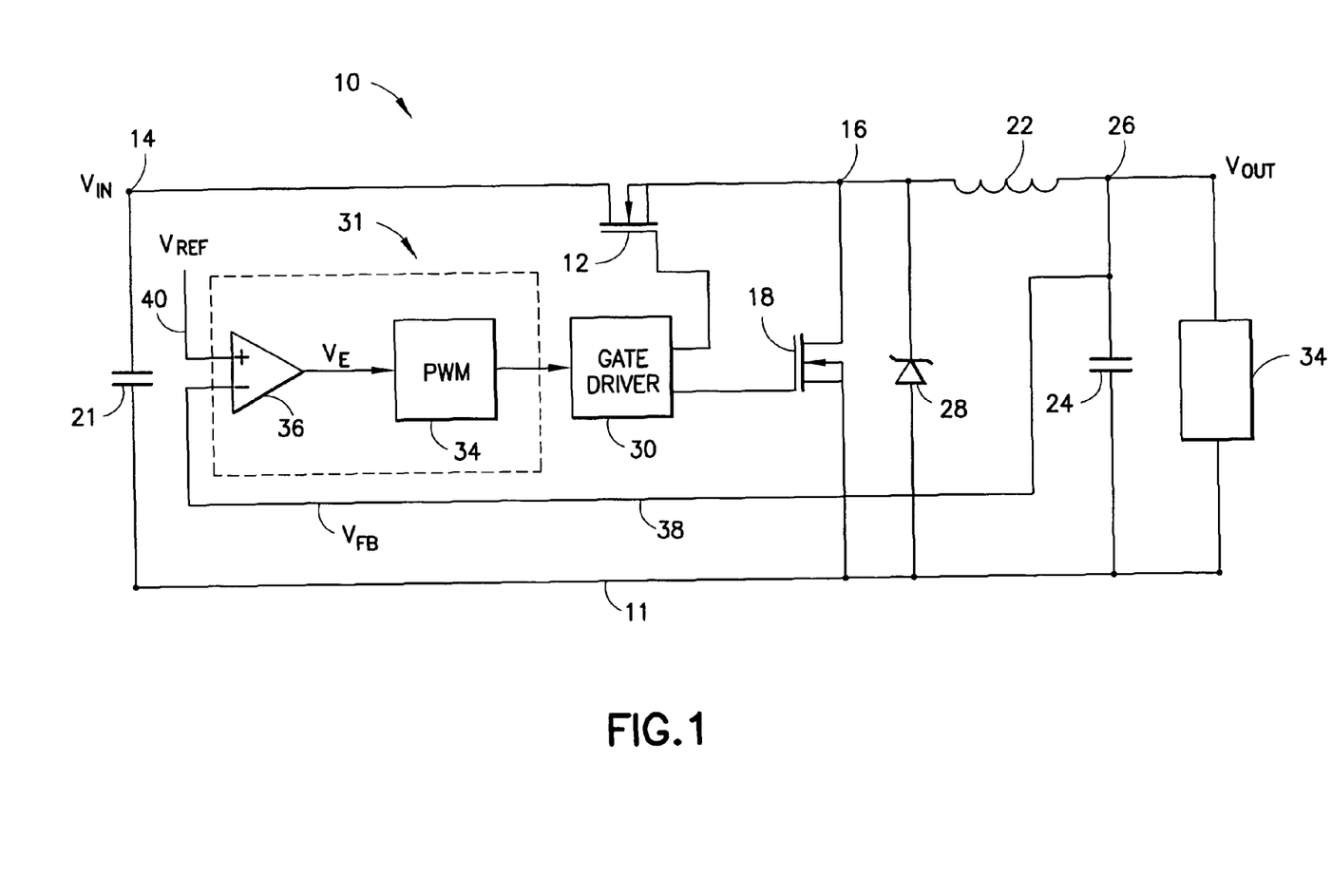
FIG. 1 illustrates an exemplary embodiment of a synchronous buck converter.

FIG. 1 illustrates a basic configuration of a synchronous buck converter 10. While the controller of the present invention may be utilized with any switched mode power supply, the present specification will describe the control circuit with reference to a synchronous buck converter of the type illustrated in FIG. 1. The converter 10 includes a series switch 12 which is typically a power MOSFET or the like, with its source-drain path connected between an input terminal 14 and a first signal node 16, a shunt switch 18, also typically a power MOSFET or the like, and an output circuit comprised of a series inductor 22 and a shunt capacitor 24 connected to inductor 22 at a signal output node 26 and to ground 11. A shunt diode such as Shottky diode 28 may also be provided in parallel with MOSFET 18 if desired to provide conduction during the deadtimes of the switch 18 to reduce the diode reverse recovery loss associated with the internal body diode of MOSFET 18. A separate diode is not required if the higher switching loss is deemed preferable to the added cost of the external Shottky.

A D.C. input voltage $V_{IN}$ is provided between input terminal 14 and ground 11 across an input capacitor 21, and an output voltage $V_{OUT}$ which is less than $V_{IN}$ is provided to a load 34 connected between signal output node 26 and ground 11.

Control of the output voltage is provided by selectively varying the on-off duty cycles of MOSFETS 12 and 18. This is done by a gate control logic or driver circuit 30 connected to the gate terminals of the MOSFETS, and driven by a pulse width modulation circuit 31 which includes a PWM generator 34 which compares a ramp signal of the required switching frequency, with fixed maximum (peak) and minimum (valley) values, with a signal provided by an error amplifier 36. The latter provides an output signal $V_F$ based on the difference between the actual output voltage represented by a feedback signal $V_{FB}$ on signal line 38 and a desired output voltage signal $V_{REF}$ provided at a second input terminal 40.

In operation, with MOSFET 12 ON and MOSFET 18 OFF, the voltage across inductor 22 is equal to $V_{IN}-V_{OUT}$, and the resulting current charges capacitor 24. To maintain substantially constant voltage across capacitor 24, a predetermined value of $V_E$ operates PWM circuit 31 and gate driver 30 to switch MOSFET 12 OFF, and MOSFET 18 ON when appropriate. The very low source-drain resistance of MOSFET 18 when it is conducting maintains a circuit to sustain the current flow through inductor 22. This, in turn, allows capacitor 24 to charge, and after several on-off cycles for the MOSFETS, a steady-state output voltage is achieved. The operation of the circuit shown in FIG. 1 is well known to persons skilled in the art, and a further description will be omitted in the interest of brevity.

As noted above, however, the pulse width modulation control provided by the PWM circuit 31, for example, of FIG. 1 presents certain problems when it is implemented as a digital circuit. One solution to the problems described above is to utilize fixed pulse width frequency modulation in place of the pulse width modulation (PWM) described above in order to control the duty cycle of the switches in the converter 10, for example.

Figure 1A:
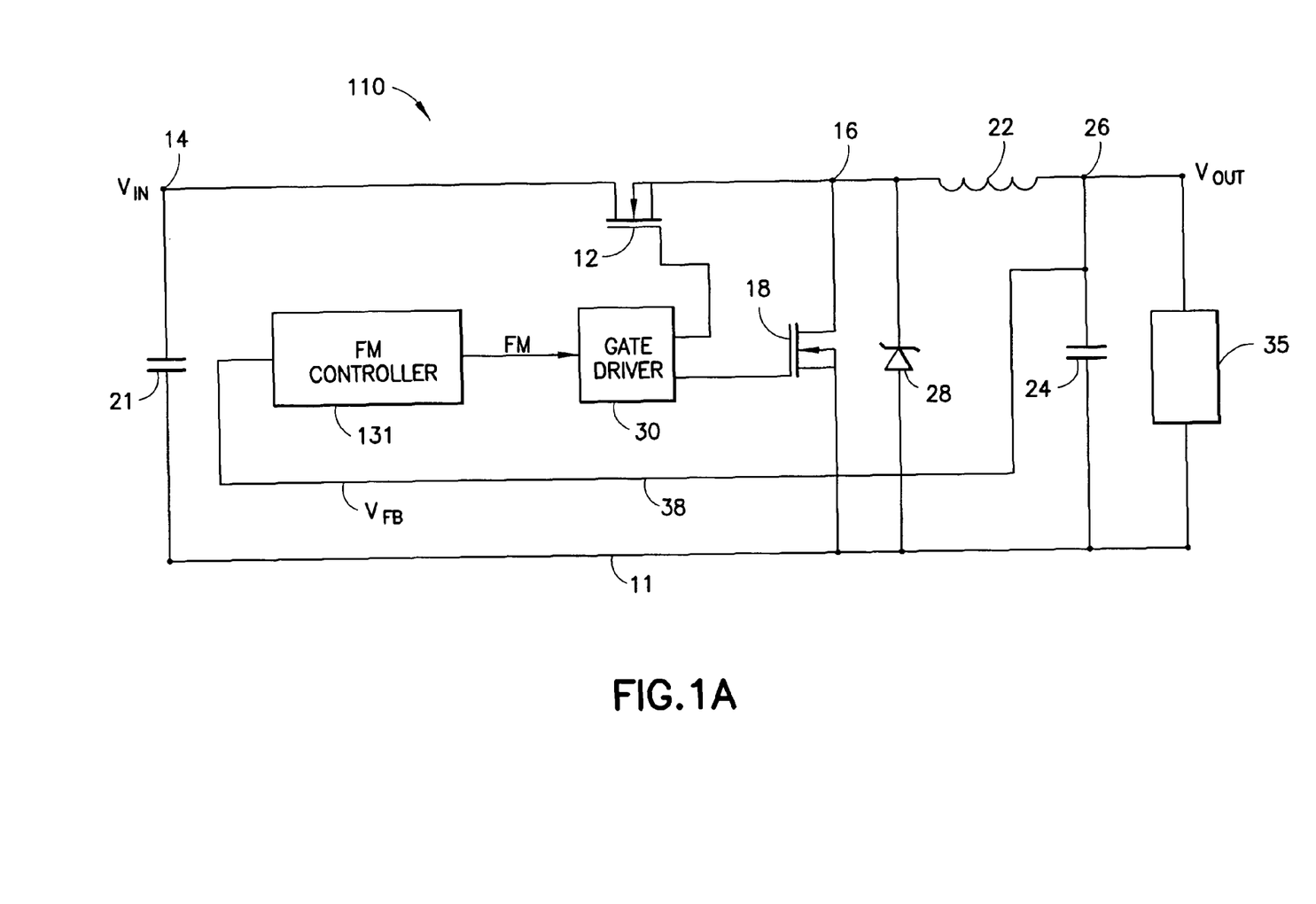
FIG. 1A is a block diagram of a synchronous buck converter including a frequency modulation controller in accordance with an embodiment of the present invention.

FIG. 1A illustrates a buck converter 110 utilizing fixed pulse width frequency modulation to provide a frequency modulation signal FM that indicates a desired duty cycle of the switches in the converter 110 in accordance with an embodiment of the present invention. As illustrate in FIG. 1A, the converter 110 is very similar in construction to the converter 10 in FIG. 1, and thus, common reference numerals will be used to refer to common elements. The PWM circuit of FIG. 1 is analog based, however, this will make little difference for purposes of the following explanation. The main difference between the converter 110 of FIG. 1A and the converter 10 of FIG. 1 is that a frequency modulation controller 131 is substituted for the PWM circuit of FIG. 1. As a result, the frequency modulation signal FM is provided to the gate driver 30 in FIG. 1A to control the duty cycle of the switches 12, 18.

Figure 2:
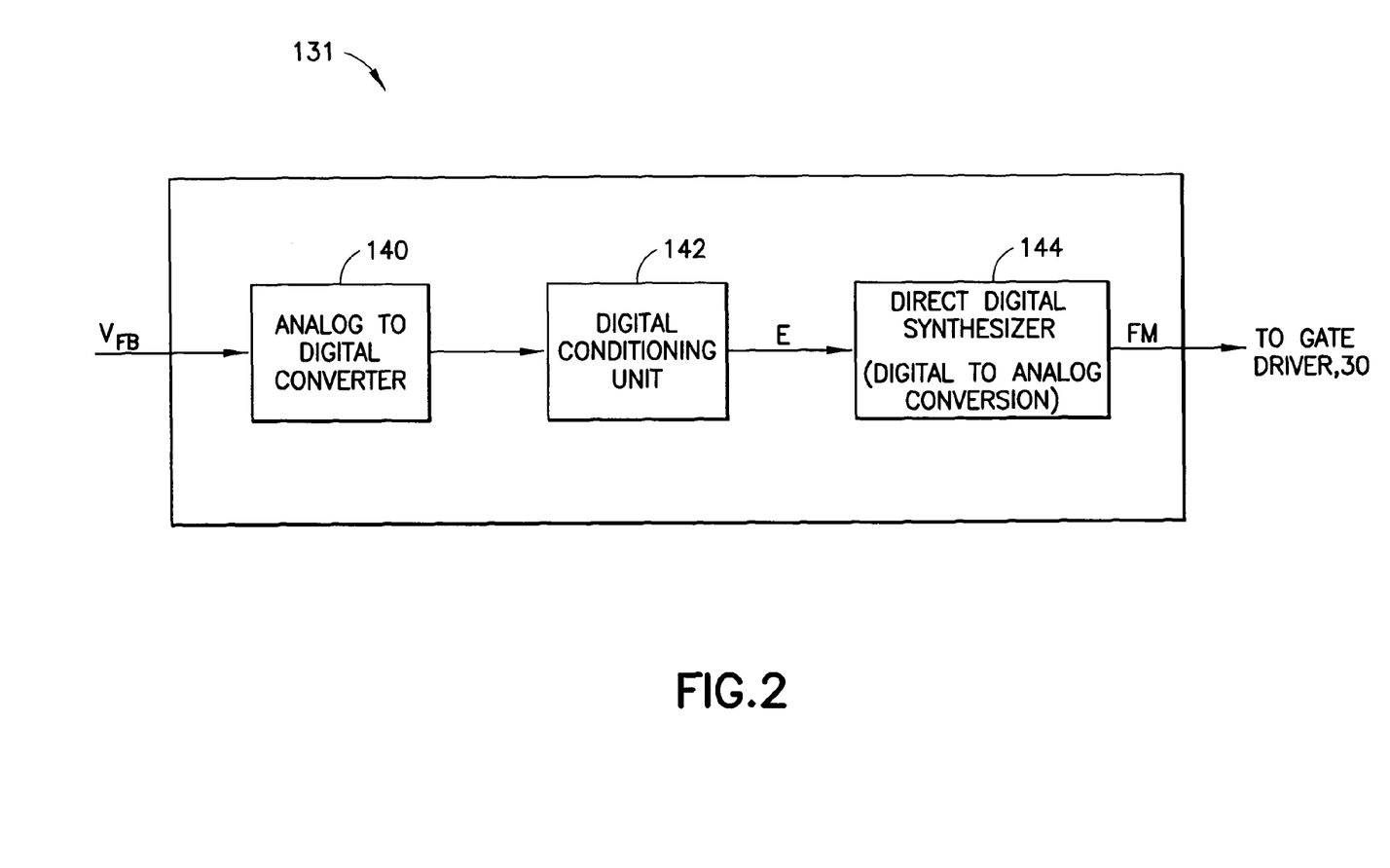
FIG. 2 is a more detailed illustration of the frequency modulation controller of FIG. 1A.

FIG. 2 is a more detailed illustration of the frequency modulation controller 131 of FIG. 1A. In simplified form, the frequency modulation controller 131 includes an analog to digital (A/D) converter 140, since it is preferably implemented as a digital circuit, which is used to digitize the feedback data provided in the feedback voltage signal $V_{FB}$. This data may be gathered using a variety of sensors that monitor various parameters, however, generally all of these parameters are related to the present output voltage of the converter 110. The A/D converter 140 may be implemented in any desired fashion, and while illustrated with a single output, may provide a multiple bit output as well. The digital data from A/D converter is then provided to a digital conditioning unit 142. The digital conditioning unit may be implemented as a programmed microprocessor, a digital signal processor, an ASIC, or in any other suitable or desired manner to provide digital filtering, and compensation according any suitable or desired compensation algorithm appropriate for digital switched mode power supply control loops to provide for frequency modulation. The result is an error signal E in the form of a numeric representation of the compensated feedback signal which is used to provide the frequency modulation signal FM that is provided to the gate driver 30. In a preferred embodiment, this signal E first passes through an digital to analog (D/A) converter to convert the digital data back to analog form. In a preferred embodiment, a direct digital synthesis device 144 is used to accomplish this task. However, any other D/A converter may be utilized as well. The resulting frequency modulation controller 131 provides high resolution control of the converter 110 at most any clock frequency.

Figure 3:
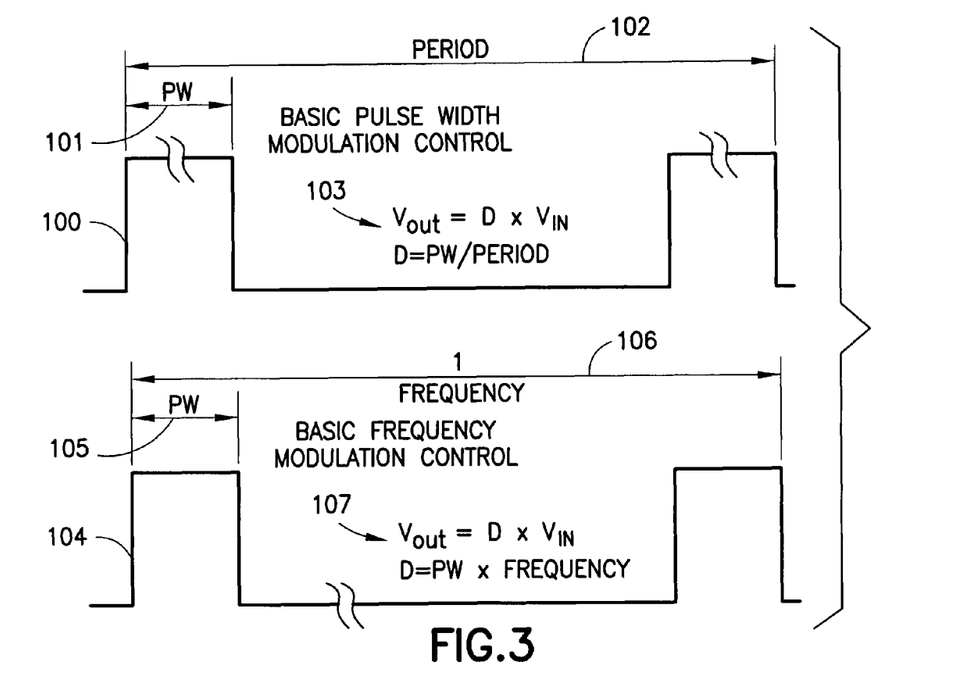
FIG. 3 is a graph comparing a PWM waveform to an FM waveform.

FIG. 3 illustrates a PWM waveform 100 and an FM waveform 104 at a static operating point. As illustrated, there is little difference between the two under these conditions. As the output is varied around a static point, differences become more apparent. The noticeable difference is that the pulse width 101 in the PWM waveform 100 varies while the frequency 106 varies in the FM waveform 104. The equations 103 and 107 represent the transfer response for each of the waveforms 100, 104, respectively. A careful review of these equations reveals that through minor algebraic manipulation, the equations can be made to be identical. Thus, the similarity of waveforms 100, 104 is apparent.

Figure 4:
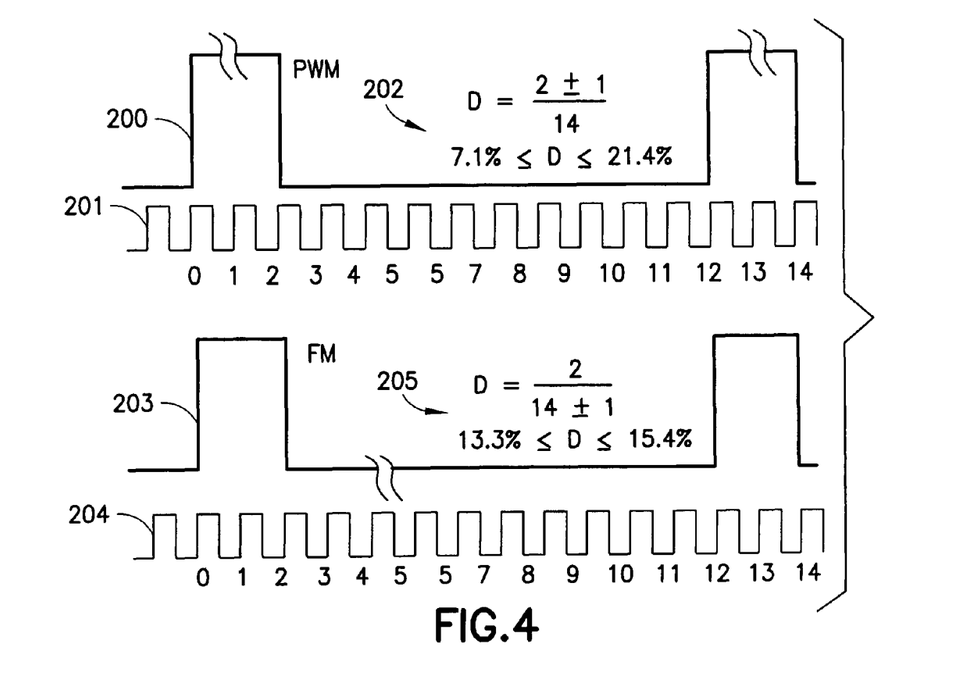
FIG. 4 is another graph comparing a PWM waveform to an FM waveform.

FIG. 4 illustrates a PWM waveform 200 and an FM waveform 203 in a discrete time system environment. The waveforms 201 and 204 represent the system clock used for waveform timing. The minimum amount of time a pulse width can change is one clock interval. By comparing equations 202 for the PWM waveform 200 with the equation 205 for the FM waveform 203, the differences between the PWM and FM approaches becomes more clear. As illustrated, for the PWM waveform, the value D varies over a range of 14.3%. In contrast, the value D for the FM waveform 203 varies over a range of only 2.1%. Thus, the range of the FM wave is 7 times less than that of the PWM waveform. Since both approaches provide an average output voltage by toggling back and forth across a bit boundary, the much narrower range provided by the FM approach provides superior results and higher resolution. The FM approach provides a much smaller ripple signal due to the narrower range. In fact, using this approach, when a 100 Mhz clock is used and the same 1 Mhz operating frequency is provided to convert 12 volts to 1 volt, 1% resolution is provided. Thus, under the same circumstances, the control resolution is a factor of 10 better than conventional control circuits utilizing PWM.

Thus, it is clear that the use of frequency modulation improves resolution for control of the duty cycle of the switches in the converter 110 since the limitations imposed by the clock intervals are minimized by varying frequency instead of pulse width. Additional benefits may be obtained by utilizing the direct digital synthesis (DDS) device 144 to provide the frequency modulation signal FM described above. In general, DDS may be used to generate any continuous wave output directly from a binary tuning word. The resolution of the DDS generated signal is related to the number of bits used in the tuning word and not on the sampling clock frequency. Thus, any inherent limitation of the clock is eliminated utilizing this approach.

Figure 5:
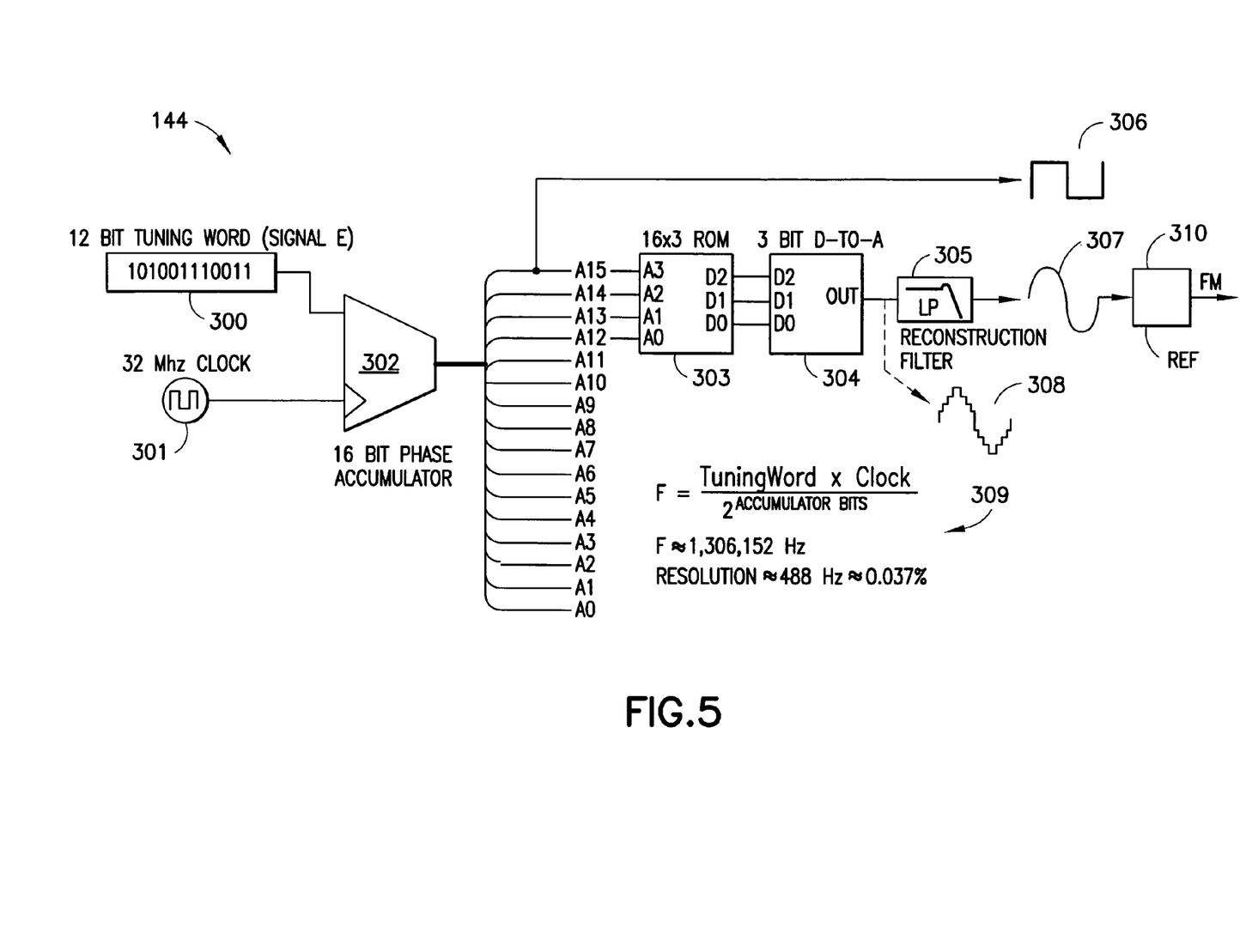
FIG. 5 is an exemplary block diagram of a direct digital synthesis device of the frequency modulation controller of FIG. 2.

FIG. 5 illustrates an exemplary embodiment of a DDS device 144 that may be used to generate the FM signal. The exemplary embodiment of FIG. 5 highlights the lack of a relationship between word size used in the system. In FIG. 5 the tuning word 300 is 12 bits long, for example. The phase accumulator 302 is a 16 bit accumulator. In order to avoid alias outputs, the tuning word is preferably not more than 15 bits. The resolution is equivalent to one count of the tuning word. In the example of FIG. 5 using the tuning word 300, a one count change would result in a change of output frequency of about 488 Hz which is approximately 0.37%. Thus, the resolution provided by the DDS generated FM signal is even higher than that provided by the frequency modulation only. In order to utilize the circuit of FIG. 5 to provide the FM signal, the numeric representation of the error signal E described above may simply be used as the tuning word by the accumulator 302.

The spectral purity of the sine wave provided by the device is a result of several parameters including the size of the lookup table (see ROM 303) and the D-A converter 304. In addition, the sharpness of the reconstruction filter 305 is also a factor. The frequency output is in accordance with the equation 309, however, the output waveform is subject to phase jitter. Assuming that the phase is measured at the zero crossing, the jitter of the unfiltered waveform, designated by reference number 308 in FIG. 5 is identical to that of the accumulator most significant bit (MSB) which is represented by reference numeral 306 in FIG. 5. The phase jitter at this point is equal to the period of clock 301. In certain applications, this phase jitter is acceptable, and thus, there may be no need for the filter 308, for example, or even for the ROM 303 and the D-A converter 304. In this case, the MSB of the accumulator is simply used without additional processing.

If it is desirable to reduce the phase jitter, the lookup table (ROM) 303, D-A converter 304 and filter 305 are included as illustrated along with an additional comparator 310 which compares the output of the filter 305 with a reference (ref) at the output to provide a square wave. This square wave may be used as the signal FM for example. In this event, phase jitter would be reduced by a factor of 10× to 20× below that of the waveform 306 of from the MSB of the accumulator 302. As noted above, the circuit of FIG. 5 may be used to provide the frequency modulation signal FM of FIG. 1A for example, simply by utilizing the numeric representation of the compensated feedback signal in the error signal E, as the tuning word. Depending on the specific power supply being controller it may or may not be necessary to include the elements 303, 304 and 305.

Figure 6:
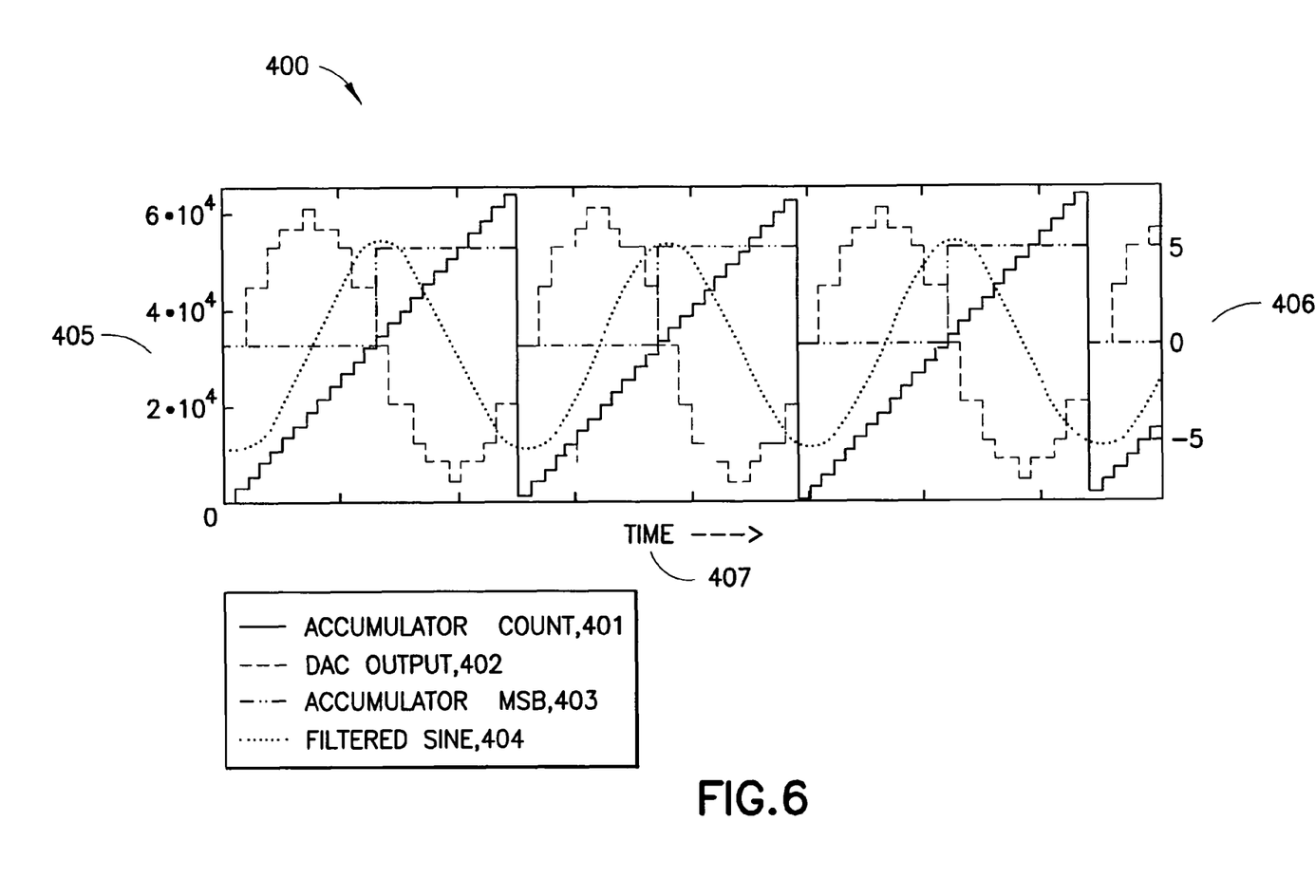
FIG. 6 is a graph illustrating the results of a simulation of the circuit of FIG. 5.

FIG. 6 illustrates a simulation of the output of the circuit in FIG. 5. The accumulator count waveform 401 steadily rises. It is noted that if the accumulator scale is evenly divisible by the tuning word, the accumulator minimum and maximum values will fall on zero, and the scale limit (scale maximum value), respectively. This is not the case in the present example. The tuning word 300 does not divide evenly into the accumulator scale, thus, the accumulator value periodically falls on zero, and the scale limit (full scale), but never both in the same cycle.

A high degree of granularity is represented in the digital to analog (DAC) waveform 402. Thus, it would typically not be useful to use this signal, without filtering, to generate a clock since the phase jitter is identical to the accumulator MSB waveform 403.

In many cases, the MSB waveform 403 has a sufficiently small phase jitter to be useful. However, if smaller phase jitter is desired, the filtered sine wave 404 may be fed into a comparator, as noted above, to generate a square wave. In addition, it may be useful to trade overall clock frequency in order to reduce overall complexity required to provide the filtered sine wave.

Figure 7:
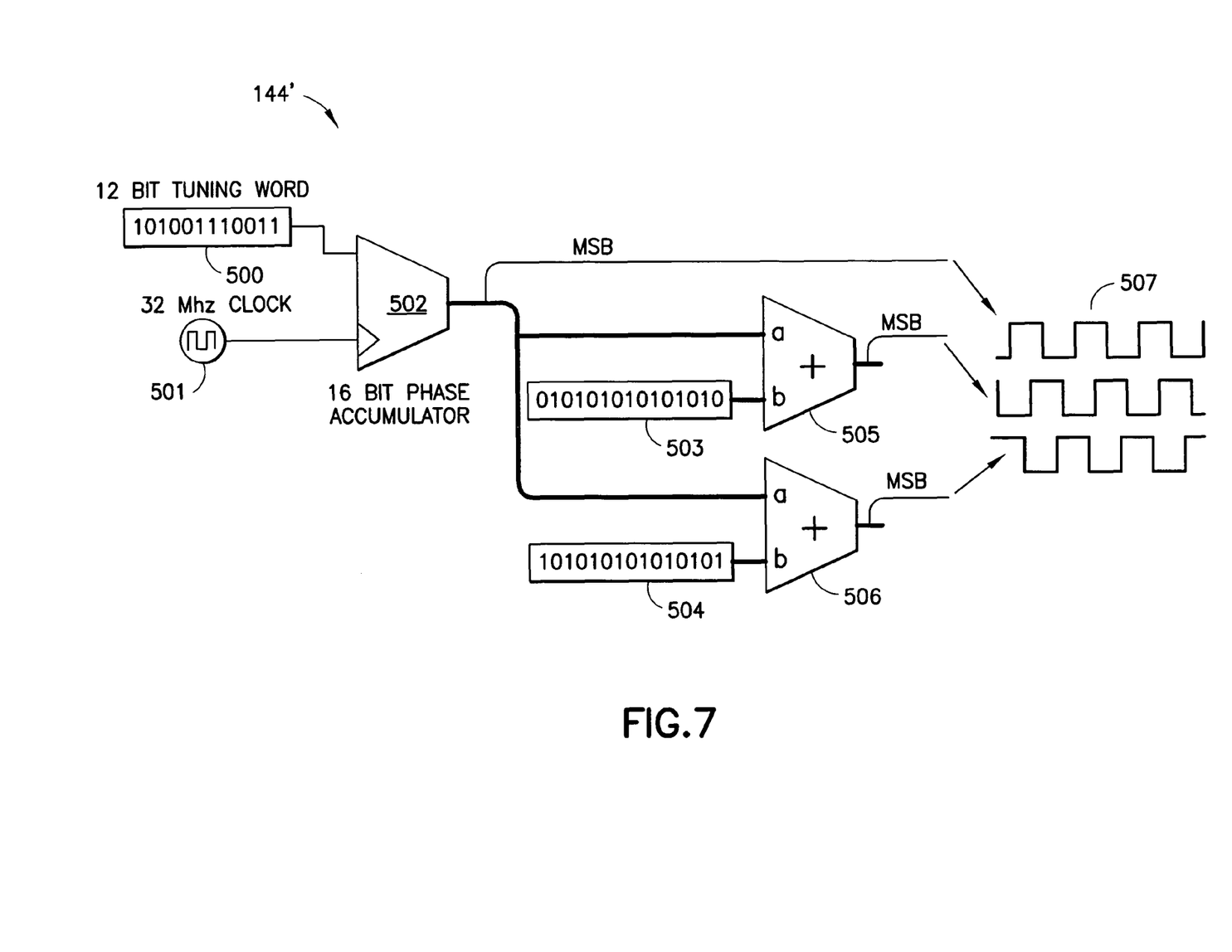
FIG. 7 is an illustration of another embodiment of a directed digital synthesizer in accordance with the present invention.

FIG. 7 illustrates an alternative embodiment of a direct digital synthesizer device 144' in accordance with an embodiment of the present invention. The device 144' of FIG. 7 provides a multi-phase oscillator signal. In this simple exemplary embodiment the phase accumulator 502 output is provided to one or more digital adders 505, 506 of the same number of bits. A constant value is added to each of the signals which results in an offset from the phase accumulator. In the example of FIG. 6 the second phase is offset by ⅓ of the accumulator full scale and the third phase is offset by ⅔ of the accumulator full scale. Any number of phases may be created by adding one adder per phase and then setting constants at $2A/n$, $2\times 2A/n$ ... $(n-1)\times 2A/n$, where A is the number of phase accumulator bits. While not generally necessary to control a switched mode power supply, it may be useful to provide multiple phase signals in certain applications.

The control circuit of the present application utilizes frequency modulation to provide more accurate control of the duty cycle of the switches of switched mode power supply. As is described above, frequency modulation eliminates the limitations imposed by the main clock when control is implemented utilizing digital circuit which allows for increased resolution in controlling the power supply. In addition, utilizing a direct digital device in conjunction with frequency modulation to generate the frequency modulation signal FM offers additional advantages in resolution since the resolution of the FM signal generated in this fashion is independent of the clock signal.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A frequency modulation controller for use in controlling a switched mode power supply including an input terminal for receiving an input voltage and at least one switch selectively turned on and off to control the output voltage of the power supply, the frequency modulation controller comprising:
   an analog to digital converter operable to convert a feedback signal indicative of a present output voltage into digital data;
   a digital conditioning unit operable to provide an error signal based on the digital data from the analog to digital converter for use in generating a frequency modulation signal; and
   a digital to analog converter device comprising:
     a memory device receiving a multiple bit signal based on the error signal and outputting an intermediate signal according to an included lookup table; and
     an intermediate digital to analog converter operable to receive the intermediate signal and output an analog signal used to generate the frequency modulation signal;
   wherein the frequency modulation signal indicates a desired duty cycle of the at least one switch to maintain a desired output voltage such that the at least one switch of the switched mode power supply is turned on and off in accordance with the desired duty cycle.

2. The frequency modulation controller of claim 1, wherein the digital to analog converter device is a direct digital synthesis device.

3. The frequency modulation controller of claim 2, wherein the direct digital synthesis device further comprises:
   a multi-bit accumulator receiving the error signal as a tuning word and providing the multiple bit signal to the memory device.

4. The frequency modulation controller of claim 3, wherein the frequency modulation signal is derived from a most significant bit of the multiple bit signal.

5. The frequency modulation controller of claim 3, wherein the direct digital synthesis device further comprises:
   a filter operable to filter the analog signal; and
   a comparator operable to compare the analog signal to a reference signal to provide the frequency modulation signal.

6. A switched mode power supply including an input terminal for receiving an input voltage and at least one switch selectively turned on and off to control an output voltage of the power supply, comprises:
   a frequency modulation controller operable to provide a frequency modulation signal based on an error signal, the frequency modulation controller comprising:
   a digital to analog converter device including:
      a multiple bit accumulator receiving the error signal and providing a multiple bit output signal;
      a memory device receiving the multiple bit output signal and outputting an intermediate signal according to an included lookup table; and
      an intermediate digital to analog converter operable to receive the intermediate signal and output an analog signal used to generate the frequency modulation signal;
   wherein the frequency modulation signal is indicative of a desired duty cycle of the at least one switch to maintain a desired output voltage such that the at least one switch is turned on and off in accordance with the desired duty cycle.

7. The switched mode power supply of claim 6, wherein the frequency modulation controller further comprises:
   an analog to digital converter operable to convert a feedback signal indicative of a present output voltage into digital data; and
   a digital conditioning unit operable to provide the error signal based on the digital data from the analog to digital converter for use in generating the frequency modulation signal.

8. The switched power supply of claim 7, wherein the digital to analog converter device is a direct digital synthesis device.

9. The switched power supply of claim 8, wherein the direct digital synthesis device further comprises:
   a filter operable to filter the analog signal; and
   a comparator, operable to compare the analog signal to a reference signal to provide the frequency modulation signal.

10. The switched power supply of claim 6, wherein the frequency modulation signal is derived from a most significant bit of the multiple bit output signal.

* * * * *